(12) United States Patent
Jahnke

(10) Patent No.: US 6,623,537 B1
(45) Date of Patent: Sep. 23, 2003

(54) REMOVAL OF SOOT IN GASIFICATION SYSTEM

(75) Inventor: Frederick C. Jahnke, Rye, NY (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 09/786,788

(22) Filed: Mar. 9, 2001

Related U.S. Application Data

(60) Provisional application No. 60/108,615, filed on Nov. 16, 1998.

(51) Int. Cl.[7] ................... B01D 47/00; B01D 53/00; B01J 8/00
(52) U.S. Cl. ................... 48/197 R; 48/211; 48/214 R; 422/188; 422/189; 422/232; 422/234; 95/90; 95/92; 95/94; 95/149; 95/154; 95/187
(58) Field of Search ................... 48/197 R, 200, 48/201, 202, 203, 211, 214 R, 197 FM; 422/188, 189, 211, 232, 234; 95/36, 37, 90, 92, 94, 149, 154, 187

(56) References Cited

U.S. PATENT DOCUMENTS

| | | | | |
|---|---|---|---|---|
| 3,979,188 A | * | 9/1976 | McCallister | 48/215 |
| 4,021,366 A | * | 5/1977 | Robin et al. | 252/373 |
| 4,289,647 A | * | 9/1981 | Tippmer | 252/373 |
| 4,402,710 A | * | 9/1983 | Stellaccio | 48/197 R |
| 4,525,280 A | * | 6/1985 | Vasconcellos et al. | 210/728 |
| 4,647,294 A | * | 3/1987 | Jahnke | 48/69 |
| 4,699,631 A | * | 10/1987 | Marion | 48/197 R |
| 4,861,346 A | * | 8/1989 | Najjar et al. | 44/280 |
| 4,950,307 A | * | 8/1990 | Najjar et al. | 44/281 |
| 5,415,673 A | * | 5/1995 | Hilton et al. | 48/197 R |

FOREIGN PATENT DOCUMENTS

| | | | | |
|---|---|---|---|---|
| GB | 1321069 A | * | 6/1973 | C01B/2/14 |

* cited by examiner

*Primary Examiner*—Jerry D. Johnson
*Assistant Examiner*—Alexa A. Doroshenk
(74) *Attorney, Agent, or Firm*—Rodman & Rodman

(57) ABSTRACT

The raw syngas generated in a partial oxidation gasifier also includes carbon soot which is removed and recovered from the syngas by scrubbing with water. The scrubbing water contains one or more high temperature surfactants which allow greater soot concentrations in the water-scrubbing quench zone of the gasifier. The carbon soot is separated from the scrubbing water with the aid of a scrubbing oil. The separation of the carbon soot from the scrubbing water is enhanced with the aid of one or more surfactants that render the soot particles hydrophobic and oleophilic. The recovered carbon soot is ultimately recycled to the gasifier to recover the energy value of the carbon during the partial oxidation reaction. The overall energy efficiency of the gasification process can be increased by removing all or a significant portion of the water from the soot mixture before recycling the soot. Separating the soot from the water allows for independent regulation of the soot and water recycle streams, depending on the reaction conditions in the gasifier.

7 Claims, 1 Drawing Sheet

REMOVAL OF SOOT IN GASIFICATION SYSTEM

This application claims the benefit of Provisional application Ser. No. 60/108,615, filed Nov. 16, 1998.

FIELD OF THE INVENTION

This invention is directed to improvements in the process of partial oxidation of hydrocarbonaceous feedstocks to produce synthesis gas or syngas mixtures comprising $H_2$, CO, and other gaseous materials. In particular, the improvements relate to the recovery of unreacted carbon and to temperature moderation of the reactor used to produce the gaseous materials where a hydrocarbonaceous feed in admixture with a dispersion of recycled carbon-soot is introduced into a gasification system, particularly an oil-fed gasification system.

BACKGROUND OF THE INVENTION

The production of syngas from hydrocarbonaceous feedstocks requires the addition of oxygen to the syngas reactor, which is also known as a syngas generator, or gasifier. Such processes also require the addition of a moderator such as $CO_2$, steam or water to maintain the reactor temperature within permissible limits set by the economics of the operation and the limits of the reactor's refractory materials of construction.

A problem associated with the partial oxidation gasification process is the presence of unreacted or unconverted carbon, mostly in the form of soot, in the raw syngas product. Several techniques can be used to remove the soot, the most common being to scrub the syngas product with water in a scrubber where the entrained carbon is transferred to the scrubbing water and a scrubbed soot-free syngas is produced.

The soot-containing water can be further processed using petroleum naphtha to extract the carbon from the water phase. The soot can then be extracted from the petroleum naphtha with a heavy oil. The heavy oil will then contain substantially all the entrained carbon and can be used as feedstock for the partial oxidation reactor, thereby utilizing the energy value of the carbon. Benzene can be used as an alternative to naphtha as an extracting agent for the carbon. After separating the carbon from the water with the benzene, the benzene is stripped off and recovered for reuse.

Another technique used to remove the unreacted or unconverted carbon is to filter the scrubbing water and to recover the carbon filter cake for further processing.

U.S. Pat. No. 3,979,188 to McCallister discloses a method of concentrating the water-carbon slurry from the reactor gaseous effluent scrubbing step to about 5 to 7 percent carbon, mixing the concentrated slurry with a fuel oil and returning the carbon/oil/water mixture without vaporization to the partial oxidation reactor as a substitute for the commonly used superheated high pressure steam moderator.

U.S. Pat. No. 4,699,631 to Marion also discloses a method for concentrating an aqueous dispersion of soot to produce a pumpable soot-water dispersion of about 0.55 to 4.0 weight percent of carbon soot, and recycling the soot-water dispersion to the gas feed to the partial oxidation gasifier.

U.K Patent No 1,321,069 to Shell International Research discloses carbon soot removal by agglomerating the soot particles with a hydrocarbon oil as an auxiliary agent. The use of an auxiliary substance that renders the soot particles hydrophobic and oleophilic is also disclosed. Once formed, the agglomerated particles are physically removed using a sieve, are dried to remove residual water, and are finally recycled back to the gasifier as a reactant.

U.S. Pat. No. 4,289,647 to Tippmer discloses a method for recovering carbon from the effluent gas of a gasification reaction. The gas is quenched with water to separate the unburned carbon and ash, and the heat of the effluent gas is used to produce steam. The wash water is then decanted to separate it into clear water, carbon-containing water, and ash mud. The carbon-containing water is used to produce steam to control the conversion of the ash oil in the gasification reaction.

Partial oxidation gasifiers usually operate at high conversion rates to minimize soot formation. High soot formation is undesirable due to unstable soot suspensions and to increased bulk viscosity. Greater soot formation means a lower cold gas efficiency unless the heat value of the soot is recovered.

The amount of water that can be used to scrub the soot is limited to that needed to function as a moderator in the partial oxidation gasifier as determined by a heat balance. The amount of soot generated is set by the carbon:oxygen ratio. Thus the amount of water cannot be varied to prevent excessive soot buildup. It is an object of this invention to separate the water and soot streams to allow for a variation of the quantity of quench water used to scrub the soot.

It is another objective of this invention to maintain a low viscosity in the soot/water or soot/oil mixture. Ideally, the gasifier could be run at lower syngas conversion rates while maintaining a low viscosity in the soot/water or soot/oil mixture.

In the partial oxidation gasification process, the raw process gas exits from the reaction zone of the gasifier at a temperature in the range of about 1700° F. to about 3500° F., typically from about 2000° F. to about 2800° F. and at a pressure of about 200 psia to about 2500 psia, typically from about 700 psia to about 1500 psia. Particulate carbon is present in the range of nil to about 20 weight percent based on the amount of carbon in the original feed.

U.S. Pat. No. 4,021,366, to Robin et al., discloses that it is desirable to maintain the concentration of particulate carbon in the quench water in the range of nil to 2 weight percent, preferably below 1.5 weight percent.

The hot raw effluent syngas stream leaving the reaction zone of the partial oxidation gasifier carries with it substantially all the particulate carbon soot produced in the reaction zone of the gasifier. The hot raw effluent syngas stream is introduced into a quench zone or chamber located below the reaction zone of the gasifier. The turbulent condition of the quench zone, caused by large volumes of syngas bubbling through the quench water present therein helps to scrub most of the soot from the syngas. The quench chamber generates quantities of soot mixed with water. This soot can be concentrated by recycling the quench water to the quench ring of the quench zone.

SUMMARY OF THE INVENTION

The raw syngas generated in a partial oxidation gasifier also includes carbon soot which is removed and recovered from the syngas by scrubbing with water. The scrubbing water contains one or more high temperature surfactants which allow greater soot concentrations in the water-scrubbing quench zone of the gasifier. The carbon soot is separated from the scrubbing water with the aid of a scrubbing oil. The separation of the carbon soot from the scrubbing water is enhanced with the aid of one or more surfactants that render the soot particles hydrophobic and oleophilic. The recovered carbon soot is ultimately recycled to the gasifier to recover the energy value of the carbon during the partial oxidation reaction. The overall energy efficiency of the gasification process can be increased by removing all or a significant portion of the water from the soot mixture before recycling the soot. Separating the soot from the water allows for independent regulation of the soot and water recycle streams, depending on the reaction conditions in the gasifier.

DESCRIPTION OF THE PREFERRED EMBODIMENTS

Figure 1:
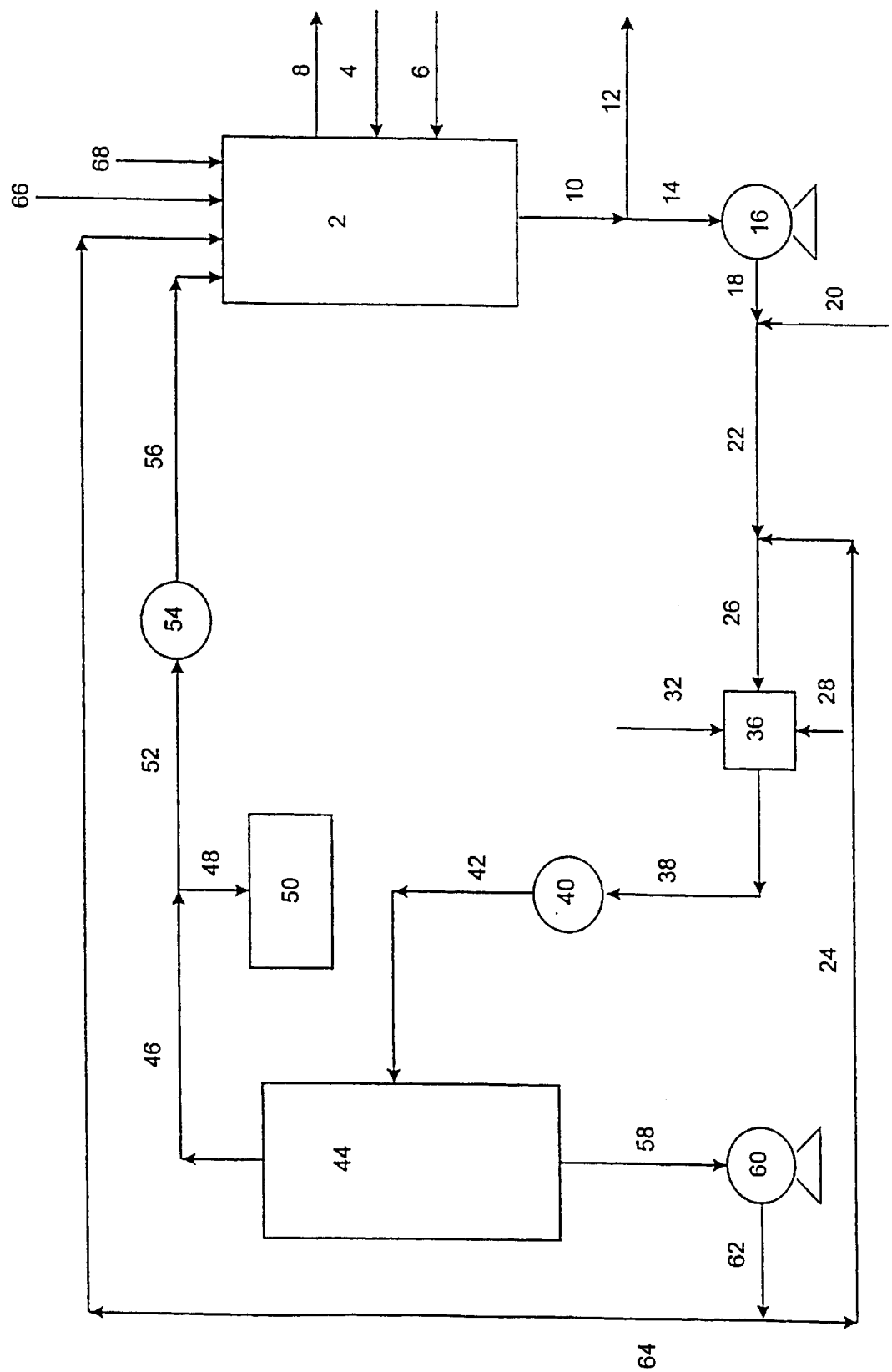
FIG. 1 is a schematic diagram of the process of the present invention.

In accordance with the present invention, the addition of one or more surfactants, such as ammonium lignosulfonate or other equivalent surfactant, enables the soot to be concentrated in the water as a stable suspension. The surfactants also improve the pumpability of the mixture by reducing overall bulk viscosity. Greater soot concentrations, on the order of about 3 weight percent or more, can be achieved in the water scrubber quench zone.

The soot/water mixture recovered from the syngas scrubbing operation is combined with a scrubber oil, is heated and routed to a high pressure separator. The water is volatilized and the soot forms a suspension with the oil in the high pressure separator. The soot-oil mixture is removed from the separator and is returned to the gasifier where it is used as a fuel source. The volatilized water, which also contains small amounts of light oil, leaves the high pressure separator and returns to the gasifier for use as a temperature moderator.

When water is used as the moderator in the gasifier, the soot and water formed during the partial oxidation gasification reaction can be recycled to the gasifier. This minimizes or eliminates the need for soot filter cake blowdown or for a carbon extraction unit to recycle the soot to the gasifier.

This invention combines the benefits of steam and water moderators by recycling soot and water into a slipstream of the oil feed to the gasifier and then vaporizing and removing the water at high pressure.

Referring to FIG. 1, raw hot syngas containing small amounts of entrained carbon soot and very small amounts of entrained mineral ash is produced in the reaction zone (not shown) at the top of gasifier 2. The hot syngas then passes to the quench zone (not shown) at the bottom of gasifier 2. Here it is contacted with quench water stream 4 and water-based solution 6 containing one or more high temperature surfactants. The temperature of the raw syngas is substantially reduced, and substantially all of the carbon soot and mineral ash is removed from the syngas. Cooled and cleaned syngas 8 leaves the quench zone for further processing by equipment outside the system.

The quench water stream 4 contains from about 0.1 weight % soot to about 1.5 weight % soot. It is generated in syngas scrubbing equipment downstream from cooled and cleaned syngas 8.

The water-based solution 6 contains one or more high temperature surfactants, such as ammonium lignosulfonate or an equivalent surfactant which is thermally stable at temperatures of about 300° F. to about 600° F. Such surfactants are well known in the art, for example, organic phosphates, sulfonates and amine surfactants. The surfactants are used to establish a stable suspension of soot in the water at the bottom of the quench chamber, where the soot concentration is in the range of about 3.0 weight % to about 15.0 weight %. The surfactants also reduce overall liquid viscosity. The concentration of active surfactants in the bottom of the quench chamber varies from about 0.01 weight % to about 0.30 weight %.

A concentrated soot-water stream 10 exits the gasifier quench zone. A small blowdown stream 12 splits from stream 10 and leaves the system. The purpose of stream 12 is to purge the system of mineral ash, such as salts and suspended heavy metals. Stream 12 can be routed to a metals recovery operation (not shown) or to a suitable waste disposal system in accordance with applicable environmental regulations. The mass flow rate of blowdown stream 12 is about 0.005 to about 0.050 that of soot-water stream 10.

The remaining soot-water stream 14 flows through pump 16 wherein its pressure is sufficiently increased to enable it to enter high pressure flash separator 44.

The pressurized soot-water 18 exiting pump 16 can be augmented with optional blowdown water stream 20 supplied from outside the system, usually from downstream syngas scrubbing equipment (not shown). Blowdown water stream 20 often contains high concentrations of ammonia and formates which are preferentially flashed in the high pressure flash separator 44. The ammonia and formates enter the reaction zone of gasifier 2 where they decompose under the severe operating conditions. By combining blowdown stream 20 with pressurized soot-water stream 18 to form high pressure soot-water/blowdown stream 22, the need for a waste-water stripping column for the aforementioned syngas scrubbing equipment is eliminated.

The combined high pressure stream 22 is then contacted with oil-soot recycle stream 24 to form a soot-oil/water stream 26 which enters a high shear kinetic mixer 36 wherein it is intimately mixed with an oil scrubber feed 28 from outside the system and with an oil-based solution 32 of one or more surfactants which serve to render the soot particles hydrophobic and oleophilic.

The oil scrubber feed 28 can be any commonly available fuel oil, but a mid-distillate in the range of about 30–50 API Gravity is preferred. The flow rate of oil scrubber feed 28 is adjusted to maintain the concentration of soot in the bottom of high pressure flash separator 44 in the amount of about 5.0 weight % to about 50.0 weight %.

The purpose of utilizing a second surfactant in the oil-based solution 32 is to render the soot particles hydrophobic and oleophilic. These surfactants are well-known in the art and include carboxylates, phosphates, sulfonates, sulfates, alcohols, glycols, amines and organic oxides, preferably polymers of alkylene glycols, alkyl ether amines, oxyalkylene amines, and oxypropylene diamines. The surfactant concentration varies from about 0.01 weight % to about 0.30 weight % of total soot/oil/water mixture 38 exiting kinetic mixer 36.

The surfactant treated intimately mixed soot/oil/water stream 38 enters heat exchanger 40 wherein it exits as heated soot/oil/water stream 42 at the conditions necessary for the desired flash separation when it enters the high pressure flash separator 44. The high pressure flash separator 44 typically operates at about 100 psi to about 200 psi above the operating pressure of gasifier 2, which operates at pressures which vary from about 200 psia to about 2500 psia, and preferably from about 700 psia to about 1500 psia. The operating temperature of high pressure flash separator 44 from about 450° F. to about 650° F.

The steam stream 46 exits high pressure flash separator 44 and contains small amounts of entrained and vaporized oil on the order of about 0.1 weight % to about 5.0 weight %. The steam stream 46 will be used as a moderator to regulate the temperature in the partial oxidation gasifier 2. However, a portion 48 of steam stream 46 that is not required for use as a temperature moderator can be divided out and introduced to waste heat and light oil recovery unit 50.

The remaining steam stream 52 which is to be used as a moderator, passes through heat exchanger 54 wherein it is superheated to a temperature of about 50° F. to about 150° F. above saturated conditions and exits as superheated steam stream 56 which enters the gasifier 2 wherein it is used as a temperature moderator. Superheating the steam improves the overall performance of the feed injector nozzle (not shown) which serves as the entry for the hydrocarbonaceous fuel 66 into the gasifier 2.

The concentrated soot-oil mixture 58 exiting high pressure flash separator 44 is substantially water-free and passes through pump 60 wherein its pressure is increased to about 100–200 psi greater than the operating pressure of the gasifier 2. The pressurized, concentrated soot-oil mixture 62 exits pump 60 and is divided into streams 24 and 64. The flow rate of stream 24 is adjusted to maintain a weight ratio of water to oil in stream 38 of from about 0.3:1 to about 3:0, respectively. The flow rate of stream 64 is controlled by the level in high pressure flash separator 44 and is essentially equal to the flow rate of scrubber oil feed stream 28.

The pressurized concentrated soot-oil mixture 64 enters partial oxidation gasifier 2, wherein it supplements the hydrocarbonaceous fuel 66 as a reactant. The weight ratio of stream 64 to stream 66 is generally from about 0.05:1 to about 0.30:1, respectively.

The remaining portion 24 of the concentrated soot-oil mixture is contacted and mixed with high pressure soot-water blowdown stream 22.

What is claimed is:

1. A process for the recovery and reuse of carbon soot accompanying raw syngas produced during the partial oxidation gasification reaction of hydrocarbonaceous feedstocks, comprising:

a) removing the carbon soot from the raw syngas by scrubbing with water in the presence of a first surfactant to form a concentrated carbon soot/water mixture and to improve the pumpability of the mixture by reducing overall bulk viscosity;

b) contacting the carbon soot/water mixture with a scrubbing oil in the presence of a second surfactant to render the soot particles hydrophobic and oleophilic and to form an intimate mixture of carbon soot/oil/water;

c) separating the carbon soot/oil/water mixture into a carbon soot/oil mixture and a vaporized soot-free water by means of a high pressure flash separation operation;

d) recycling at least a portion of the vaporized soot-free water to the partial oxidation gasification reaction to serve as a temperature moderator; and e) recycling the carbon soot/oil mixture to the partial oxidation gasification reaction wherein it is used as a fuel.

2. The process of claim 1 wherein the first surfactant is selected from the group consisting of organic phosphates, sulfonates and amines.

3. The process of claim 2 wherein the surfactant is ammonium lignosulfonate.

4. The process of claim 1, wherein the concentrated carbon soot/water mixture contains about 3.0 weight % to about 15.0 weight % carbon soot.

5. The process of claim 1, wherein the scrubbing oil is a mid-distillate in the range of about 30–50 API Gravity.

6. The process of claim 5, wherein the concentration of soot in the carbon soot/oil mixture exiting the high pressure flash separation operation varies from about 5.0 weight % to about 50.0 weight %.

7. The process of claim 1, wherein the pressure during the high pressure flash separation operation is from about 100 psig to about 200 psig greater than the pressure of the partial oxidation gasification reaction.

* * * * *